(12) United States Patent
Yoshida et al.

(10) Patent No.: US 8,644,775 B2
(45) Date of Patent: Feb. 4, 2014

(54) TRANSMISSION APPARATUS

(75) Inventors: Kazuki Yoshida, Tokyo (JP); Sadaaki Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/434,086

(22) Filed: Mar. 29, 2012

(65) Prior Publication Data

US 2012/0252386 A1 Oct. 4, 2012

(30) Foreign Application Priority Data

Mar. 30, 2011 (JP) ................................. 2011-074735

(51) Int. Cl.
*H04B 1/034* (2006.01)

(52) U.S. Cl.
USPC .......................................... 455/90.3; 455/128

(58) Field of Classification Search
USPC .......... 455/3.01, 3.05, 41.1, 66, 67.11, 550.1, 455/575.1, 90.1, 357, 348, 351, 90.3, 91, 455/128, 347; 398/129; 361/801, 814
See application file for complete search history.

(56) References Cited

U.S. PATENT DOCUMENTS

| | | | | |
|---|---|---|---|---|
| 5,500,639 A | * | 3/1996 | Walley et al. | 455/67.11 |
| 6,323,980 B1 | * | 11/2001 | Bloom | 398/129 |
| 2004/0052063 A1 | * | 3/2004 | Megason et al. | 361/801 |
| 2010/0323613 A1 | | 12/2010 | Imaeda | |

FOREIGN PATENT DOCUMENTS

| | | |
|---|---|---|
| EP | 2109245 A2 | 10/2009 |
| JP | 2006-197343 A | 7/2006 |
| RU | 2004132720 A | 5/2005 |

OTHER PUBLICATIONS

Communication dated Sep. 25, 2013, issued by the Federal Service on Industrial Property, Patents, and Trade Marks of the Russian Federation in corresponding Application No. 2012111794.

* cited by examiner

*Primary Examiner* — Thanh Le
(74) *Attorney, Agent, or Firm* — Sughrue Mion, PLLC (57) ABSTRACT

A transmission apparatus includes a case including first, second, and third stages, each stage having one slot, each slot allowing free insertion and removal of a board; a first control board; a first communication unit connected with the first control board and performing radio communication; and a second communication unit connected with the first control board and performing communication faster than the radio communication. The first control board is mounted in the slot of the first stage. The first communication unit is mounted in the slot of the second stage, and the second stage is provided on one side of the first stage. The second communication unit is mounted in the slot of the third stage, and the third stage is provided on a side opposite to the first communication unit with respect to the first stage. The second communication unit is arranged adjacent to the first control board.

11 Claims, 8 Drawing Sheets

TRANSMISSION APPARATUS

This application is based upon and claims the benefit of priority from Japanese patent application No. 2011-074735, filed on Mar. 30, 2011, the disclosure of which is incorporated herein in its entirety by reference.

BACKGROUND OF THE INVENTION

1. Field of the Invention

The present invention relates to a transmission apparatus on which a plurality of communication units, including communication units that can communicate at high speed, can be mounted.

2. Description of Related Art

Recent years have seen the proliferation of mobile communication systems that can perform voice and data communication from wireless terminals by performing wireless communication between a wireless terminal such as a mobile telephone or mobile electronic device and a mobile base station. In order for mobile operators to expand the area in which communication is possible along with the rapid spread of mobile telephones, wireless base stations have been newly installed in communication areas that mobile base stations cannot cover, that is to say, dead zones.

Conventionally, communication among a plurality of radio base stations and communication between a radio line control station that controls this plurality of radio base stations and a radio base station is generally performed via a wired network such as an underground optical cable network. However, in order to build such a wired network, immense equipment investment is required.

Therefore, in recent years, by adopting a method that wirelessly performs communication among radio base stations and communication between a radio base station and a radio line control station, attempts have been made to construct a mobile communication system easier, faster and at a lower cost compared to a wired network.

In such radio communication, for example a compact microwave communication system is utilized. A microwave communication system has an outdoor apparatus such as an antenna, and an indoor apparatus that has a transmission apparatus that processes microwaves that have been received (for example, refer to Japanese Unexamined Patent Application, First Publication No. 2006-197343).

The transmission apparatus that constitutes the microwave communication system houses within one case a communication unit that is capable of radio communication and a communication unit that is capable of optical communication that is faster than radio communication. Thereby, since the wiring has a higher density, there are problems such as malfunctioning of the transmission apparatus due to this higher density.

SUMMARY OF THE INVENTION

A transmission apparatus according to an exemplary aspect of the present invention includes: a case that includes at least first, second, and third stages, each of the stages having at least one slot, each slot allowing free insertion and removal of a board; at least first control board; at least one first communication unit that is connected with the first control board and performs radio communication; and at least one second communication unit that is connected with the first control board and performs communication that is faster than the radio communication. The first control board is mounted in the slot of the first stage. The first communication unit is mounted in the slot of the second stage, and the second stage is provided on one side of the first stage. The second communication unit is mounted in the slot of the third stage, and the third stage is provided on a side opposite to the first communication unit with respect to the first stage. The second communication unit is arranged adjacent to the first control board.

With this constitution, in addition to a communication unit that is capable of radio communication in the case of there being demand for a communication unit that is capable of optical communication that is faster than radio communication, by arranging a communication unit that is capable of radio communication and a communication unit that is capable of optical communication so as to sandwich a control board and dispersing the wiring, it is possible to increase the efficiency of the wiring and suppress an increased density of the wiring.

Also, by arranging the communication unit that is capable of optical communication to be adjacent to the control board, it is possible to shorten the wiring between the communication unit that is capable of optical communication and the control board, and it is possible to inhibit data degradation.

A communication apparatus according to an exemplary aspect of the present invention performs signal control of radio communication and optical communication. The communication apparatus includes: a control board; a first communication unit that is arranged on one side of the control board and performs the radio communication; and a second communication unit that is arranged adjacent to the control board and arranged on a side opposite to the first communication unit with respect to the control board, and performs the optical communication that is faster than the radio communication.

With to this constitution, in addition to a communication unit that is capable of radio communication in the case of there being demand for a communication unit that is capable of optical communication that is faster than radio communication, by arranging a communication unit that is capable of radio communication and a communication unit that is capable of optical communication so as to sandwich a control board and dispersing the wiring, it is possible to increase the efficiency of the wiring and suppress an increase in density of the wiring.

Also, by arranging the communication unit that is capable of optical communication to be adjacent to the control board, it is possible to shorten the wiring between the communication unit that is capable of optical communication and the control board, and it is possible to inhibit data degradation.

According to the transmission apparatus of the exemplary aspect of the present invention, it is possible to increase the efficiency of the wiring between the control board and the communication unit, and it is possible to inhibit an increase in wiring density.

DETAILED DESCRIPTION OF THE INVENTION

Hereinbelow, an exemplary embodiment of the present invention shall be described in detail with reference to the drawings.

Figure 1:
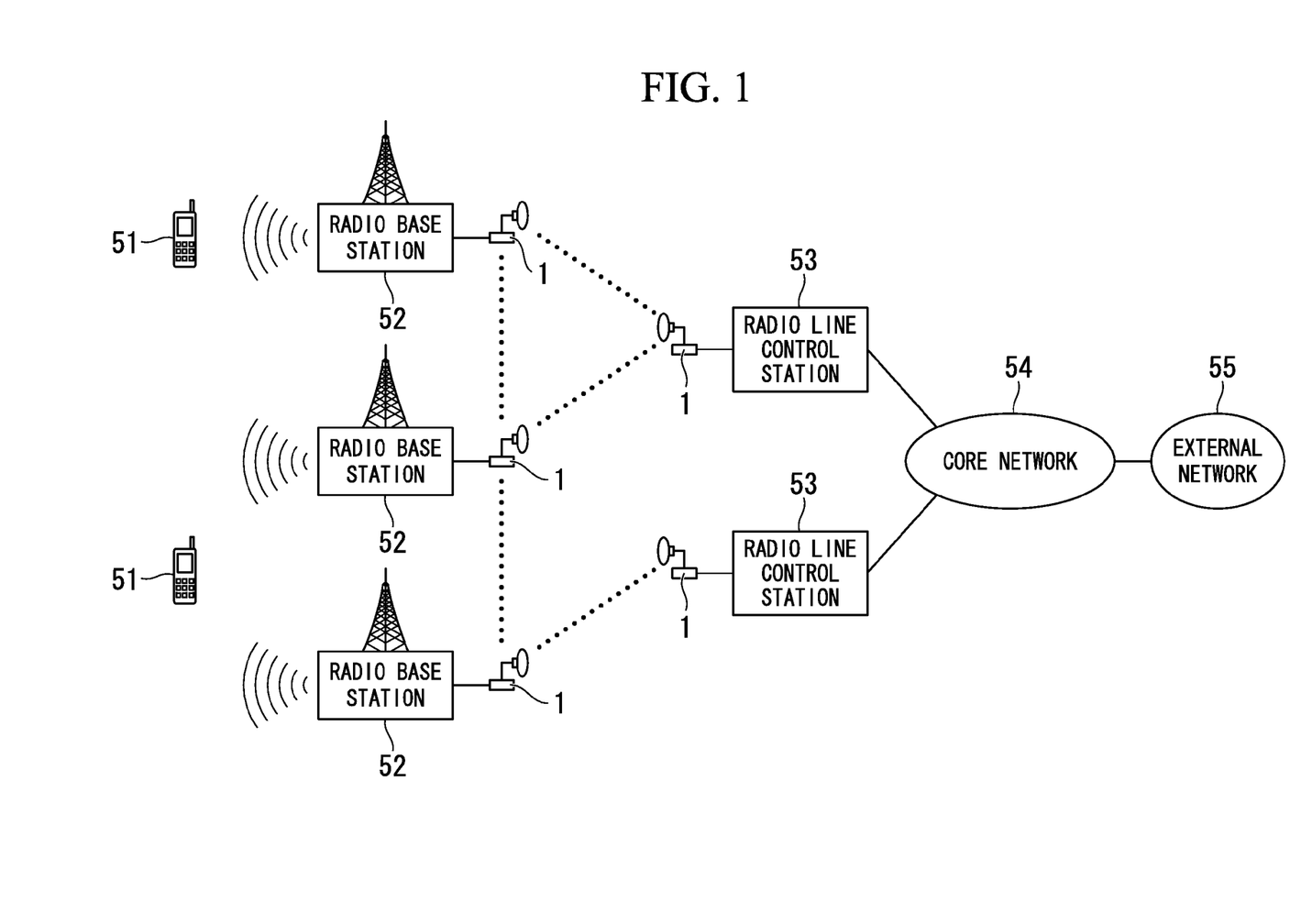
FIG. 1 is a configuration view of a communication network in which a transmission apparatus of an exemplary embodiment of the present invention is applied.

FIG. 1 is a configuration view of a communication network 50 in which a transmission apparatus 2 of this exemplary embodiment (refer to FIG. 2) is applied. The communication network 50 has radio terminals 51 such as a mobile telephone or the like, radio base stations 52, radio line control stations 53, a core network 54, and an external network 55. The radio terminals 51 are capable of communication in a range in which radio waves from the radio base stations 52 reach.

The radio base stations 52 are connected with the radio line control stations 53 that are of a higher order. The radio line control stations 53 controls a plurality of the radio base stations 52. The radio line control stations 53 are connected with the core network 54 that is the trunk line network. The core network 54 is connected with the external network 55 (for example, mobile communication networks of other communications operators and general public line networks, and the like).

A radio communication apparatus 1 is installed for each radio base station 52 and radio line control station 53. Communication between the radio base stations 52 and communication between the radio base station 52 and the radio line control station 53 is performed wirelessly. The radio communication apparatus 1 is a communication apparatus that enables high-speed radio communication by using microwaves. The radio communication apparatus 1 has an outdoor apparatus such as an antenna that sends and receives radio waves, and an indoor apparatus such as the transmission apparatus 2 that processes radio waves that have been received.

Figure 2:
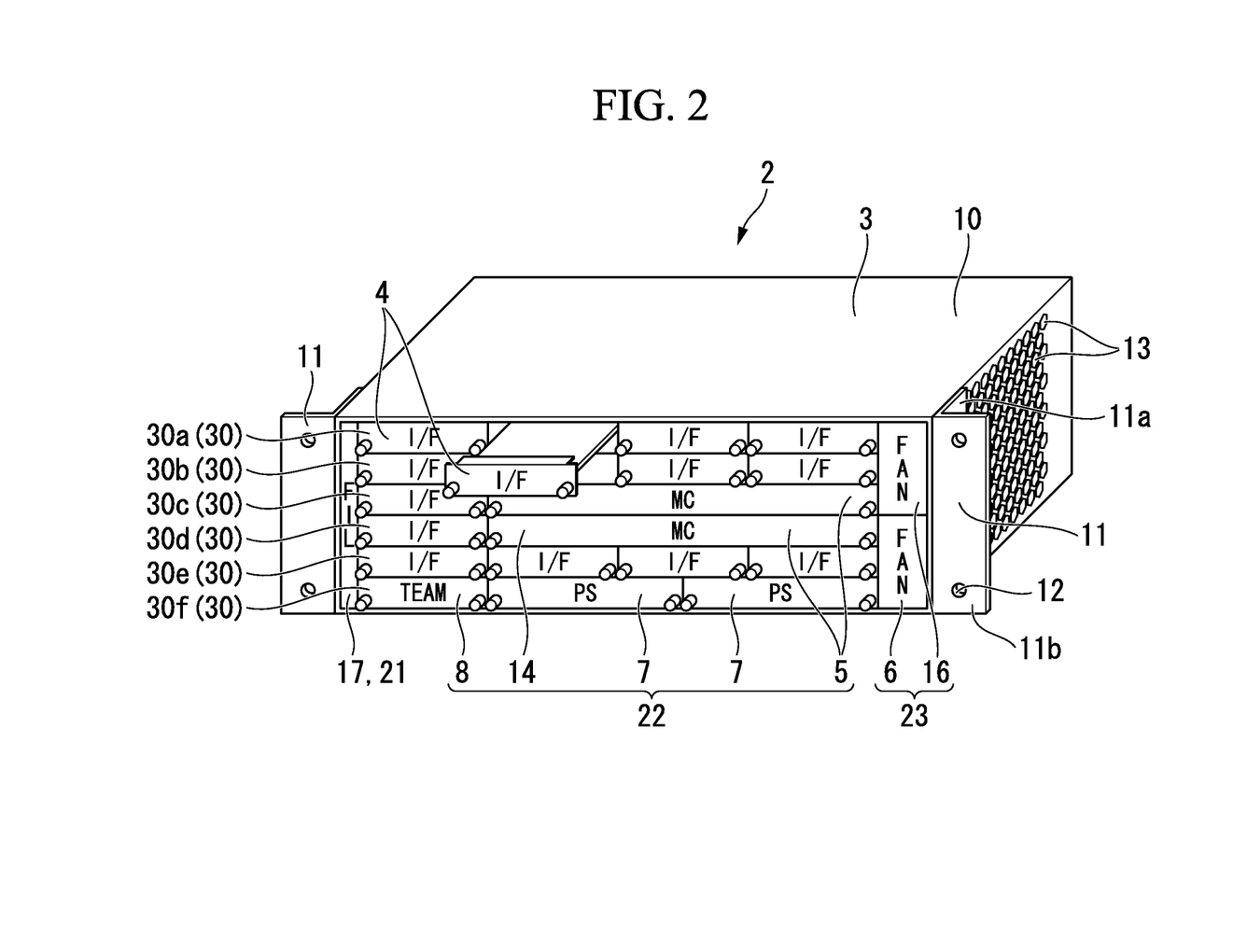
FIG. 2 is a perspective view of the transmission apparatus of the exemplary embodiment of the present invention.

As shown in FIG. 2, the transmission apparatus 2 has a case 3, a plurality of communication units 4, two control boards 5, two fan units 6, two power supply units (power supply boards) 7, an external device connection board 8, and a filter 17. The case 3 has a rectangular parallelepiped shape. The communication units 4 are installed in the case 3. The communication units 4, the control boards 5, the fan units 6, the power supply units 7, and the external device connection board 8 are connected via a mother board 9 (refer to FIG. 5).

The case 3 has a case body 10 and fixtures 11. The case body 10 is box shaped, and has an opening 14 in the front. The fixtures 11 are attached to both sides of the case body 10. The fixture 11 includes an elongated L-shaped metal fitting. One face 11*a* of the fixture 11 is fixed to the side wall of the case body 10. The other face 11*b* of the fixture 11 is fixed so as to be positioned on the same plane as the surface that constitutes the opening 14 of the case body 10. That is, the other face 11*b* of the fixture 11 is flush with the surface that constitutes the opening 14 of the case body 10. Also, a plurality of fixed holes 12 for installing and fixing the transmission apparatus 2 are formed in the other face 11*b* of the fixture 11. A plurality of ventilation holes 13 are formed in both side surfaces of the case body 10. Hereinbelow, the direction that is perpendicular with the surface that constitutes the opening 14 is referred to as the depth direction, and the horizontal direction that intersects with the depth direction is referred to as the lateral direction.

The interior space of the case 3, as seen from the opening 14 side, has three regions that are divided into three in the lateral direction. Among the three regions, the regions at both sides are respectively a filter insertion portion 21 and a fan insertion portion 23. Among the three regions, the center region is a board insertion portion 22. The board insertion portion 22 is divided into six stages 30 in the vertical direction. Hereinbelow, in the order from the upper stage 30, they are called stage 30*a*, stage (second stage) 30*b*, stage (first stage) 30*c*, stage (fourth stage) 30*d*, stage (third stage) 30*e*, and stage (fifth stage) 30*f*. Each of the stages 30*a* to 30*e* is divided into a plurality of slots 15. For example, stage 30*a*, stage 30*b*, and stage 30*e* are divided into four portions.

The fan insertion portion 23 is divided into slots 16 of two stages in the vertical direction. It is possible to mount the fan units 6 in each of the slots 16. The filter insertion portion 21 is not divided in the vertical direction. It is possible to insert the plate-shaped filter 17 in the upright state in the filter insertion portion 21. The fan unit 6 is constituted to draw out air from the interior of the case 3 and discharge it from the ventilation holes 13. The filter 17 is constituted to shut out grime and dust that is included in the air that flows into the interior of the case 3, with the air discharge by the fan unit 6.

Figure 3:
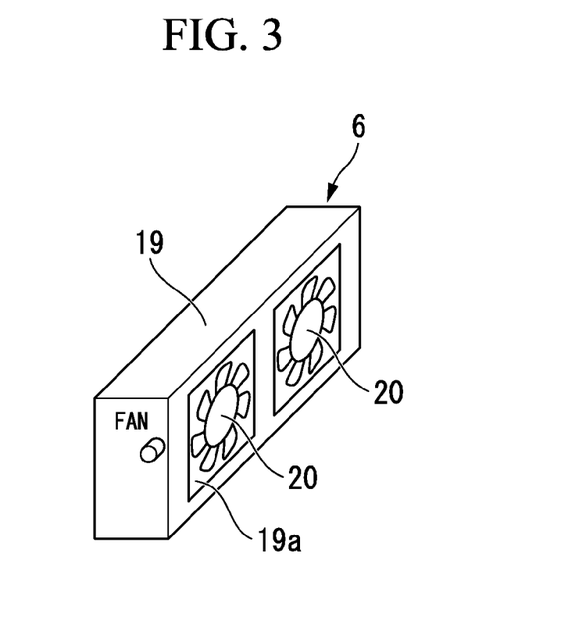
FIG. 3 is a perspective view of a fan unit of the transmission apparatus shown in FIG. 2.

As shown in FIG. 3, the fan unit 6 has a box-shaped case 19 and two fans 20. Each fan 20 is a cooling fan that has a square-shaped casing. Two of the fans 20 are arranged in the depth direction so that the blowing direction faces the lateral direction. The case 19 has a shape corresponding to the slot 16 of the fan insertion portion 23. In the case 19, a fan hole 19*a* is formed penetrating in the lateral direction at each location where the fan 20 is arranged.

Figure 4:
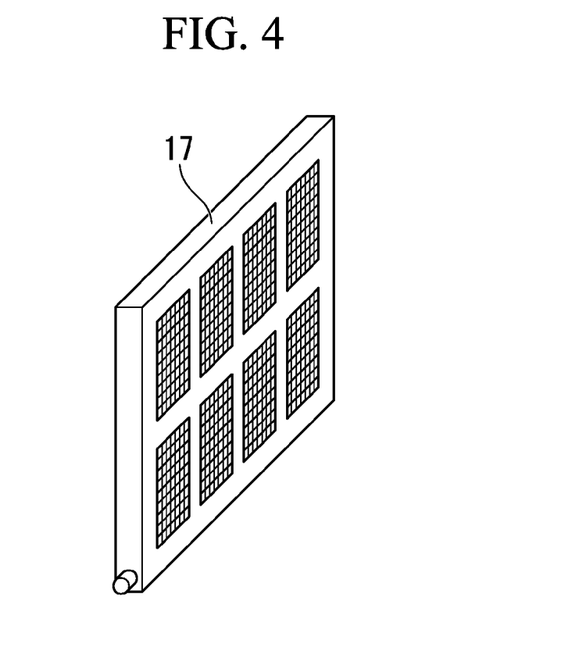
FIG. 4 is a perspective view of a filter of the transmission apparatus shown in FIG. 2.

As shown in FIG. 4, the filter 17 has a plate shape that corresponds to the filter insertion portion 21. In the filter 17, a filter that consists of a nonwoven fabric or a mesh is incorporated in a frame that is divided into a plurality. It is possible to detachably attach the filter 17 to the filter insertion portion 21.

Figure 5:
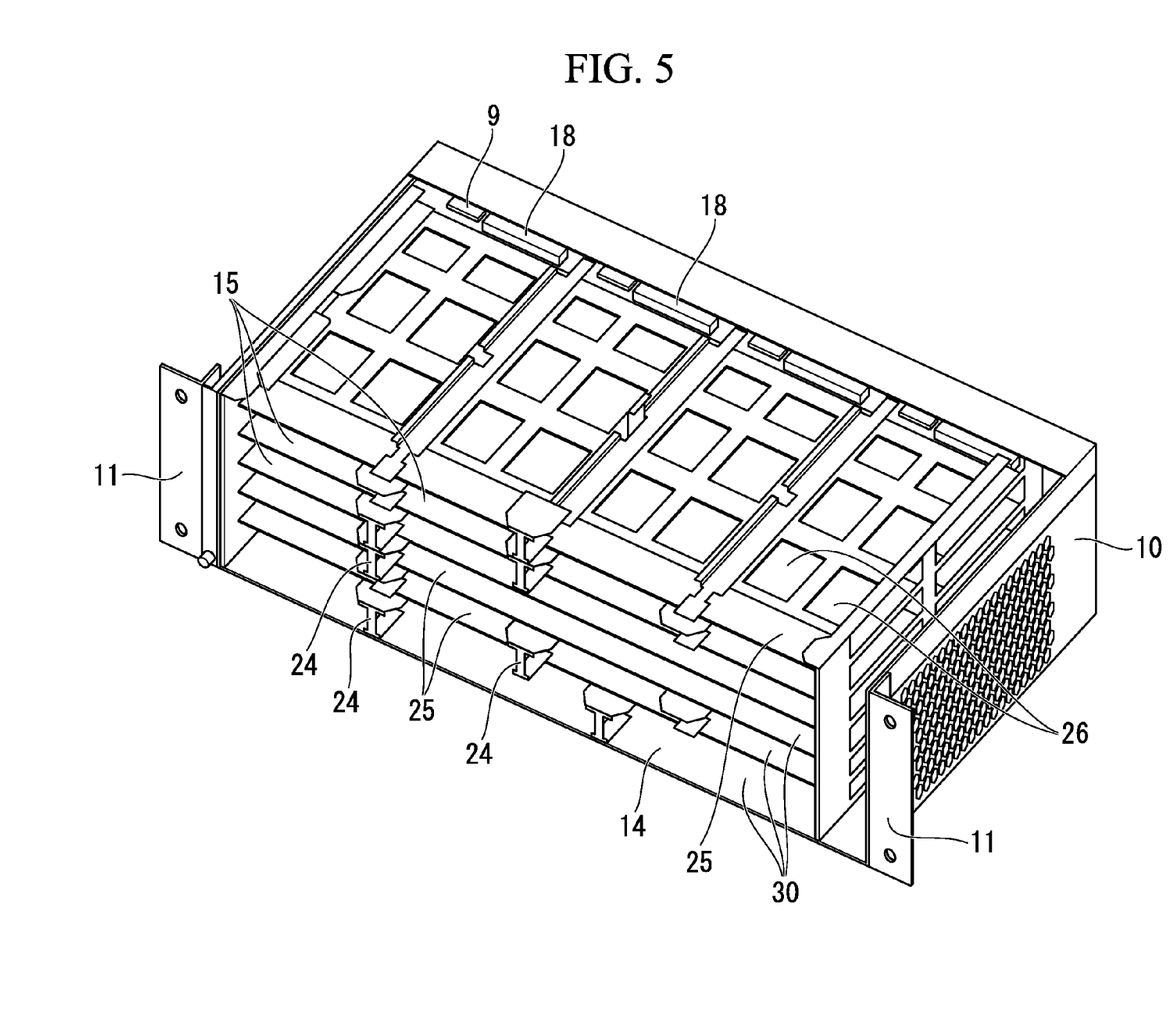
FIG. 5 is a perspective view of the internal structure of a case and a motherboard of the transmission apparatus shown in FIG. 2.

FIG. 5 is a view that shows the slots 15 of the case 3, and the motherboard 9 that is arranged at the back surface side opposite the opening 14 of the case 3. Note that in order to facilitate understanding of the explanation, in FIG. 5 illustration of the upper cover of the case 3 is omitted.

In each stage 30, a plurality of guide rails 24 are provided that guide the left/right edges of the each control board 5 that is inserted, and divide each stage 30 into a plurality of slots 15. Also, the guide rails 24 have a function of holding a divider 25 that partitions each stage 30.

A plurality of connectors 18 that are capable of connecting the communication units 4, the control boards 5, the fan units 6, the power supply units 7, and the external device connection board 8 are provided at corresponding positions on the motherboard 9. Also, a plurality of rectangular holes 26 are formed in the dividers 25. The formation of the rectangular holes 26 enables a reduction in weight of the dividers 25, and can prevent heat from becoming trapped in the interior of the case 3 during operation of the transmission apparatus 2. In FIG. 5, the rectangular hole 26 is rectangular, but is not limited thereto. The rectangular hole 26 may be any shape such as round or triangular provided it is a constitution that achieves weight saving and a more efficient heat flow.

Next, the connection configuration of each constituent element of the transmission apparatus 2, and the details of each constituent element shall be described.

Figure 6:
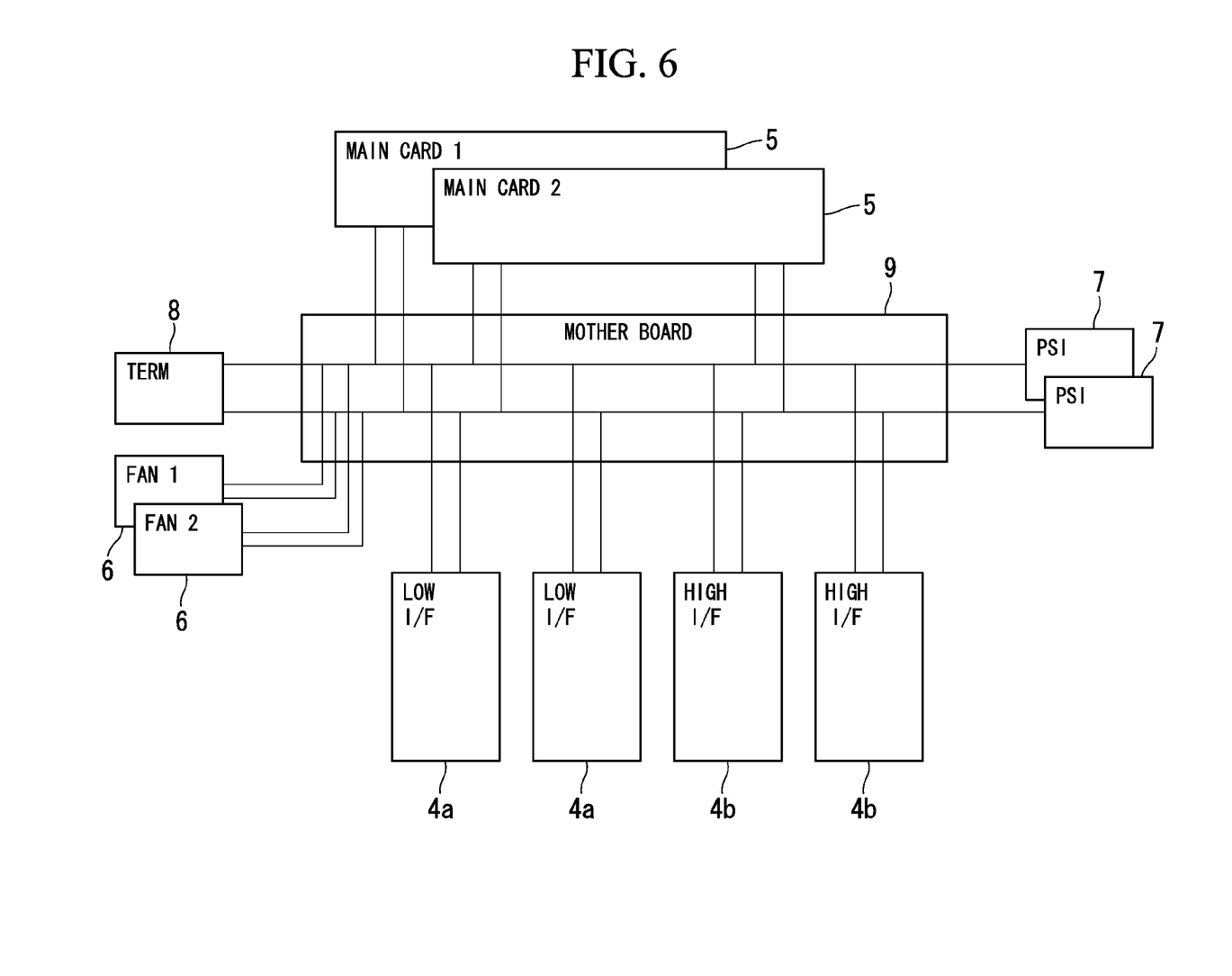
FIG. 6 is a view that shows the connection configuration of constituent elements of the transmission apparatus shown in FIG. 2.

As shown in FIG. 6, the communication units 4, the control boards (MAIN CARD 1, MAIN CARD 2) 5, the fan units (FAN 1, FAN 2) 6, the power supply units (PSI) 7, and the external device connection board (TERM) 8 are connected via the motherboard 9. The transmission apparatus 2 has the two control board 5, the two power supply unit 7, and the two fan unit 6. The transmission apparatus 2 has a constitution that allows a plurality of communication units 4 (LOW I/F 4a, HIGH I/F e4b), to be connected.

The two power supply units 7 have the same constitution, and are configured so as to supply electrical power to the control boards 5, the fan units 6, and the external device connection board 8 via the motherboard 9. The electrical power that the transmission apparatus 2 requires can be supplied by one power supply unit 7.

That is to say, the transmission apparatus 2 is configured to be operable even in the case of one among the two power supply units 7 being stopped (failed).

The two power supply units 7 are set so as to be normally operated in parallel and supply in a shared manner the electrical power that is required. On the other hand, it is set so that, in the event of one of the power supply units 7 having failed, the power supply unit 7 that has not failed supplies all of the electrical power. Also, the power supply units 7 are constituted so as to be able to replace a failed power supply unit 7 without stopping operation of the radio communication apparatus 1.

The two control boards 5 also have the same constitution. Each of the two control boards 5 has the function of integrally controlling the constituent elements of the transmission apparatus 2. That is to say, even if one of the control boards 5 is stopped, the transmission apparatus 2 is capable of being operated by the other control board 5. Also, the control board 5 is constituted so as to be able to replace a failed control board 5 without having to stop operation of the radio communication apparatus 1.

The two fan units 6 also have the same constitution. As mentioned above, the fan units 6 are constituted so as to be able to discharge air in the interior of the case 3. During normal operation, the two fan units 6, that is to say, the four fans 20, are set so as to operate. It is set so that, in the event of one fan unit 6 having failed, the remaining fan unit 6 increases its wind force.

The communication units 4 includes low-speed communication units (first communication units) 4a and high-speed communication units (second communication units) 4b. The low-speed communication units 4a are suitable for low-speed communication with a transmission speed of around 1 Gbps, and are such as radio communication or an STM (synchronous transport module). The high-speed communication units 4b are suitable for low-speed communication and high-speed optical communication of 10 Gbps or more. The transmission apparatus 2 of the present exemplary embodiment is capable of connecting 10 low-speed communication units 4a and four high-speed communication units 4b.

The control board 5 is capable of performing signal control for the above radio communication and optical communication. Moreover, the control board 5 is capable of replacing (converting) the signal between radio communication and optical communication, and thereby is capable of transmitting by radio communication a signal that is received by optical communication, and is capable of transmitting by optical communication a signal that is received by radio communication.

The low-speed communication unit 4a has a pair of modems 41 (refer to FIG. 7), an STM-1 interface 42, and a GbE interface 43. The pair of modems 41 communicate with the outdoor apparatus. The STM-1 interface 42 supports STM-1. The GbE interface 43 supports the GbE (Gigabit Ethernet (registered trademark)) standard. A connector (not illustrated) that can communicate at least electrical signals is provided in the low-speed communication unit 4a.

Figure 7:
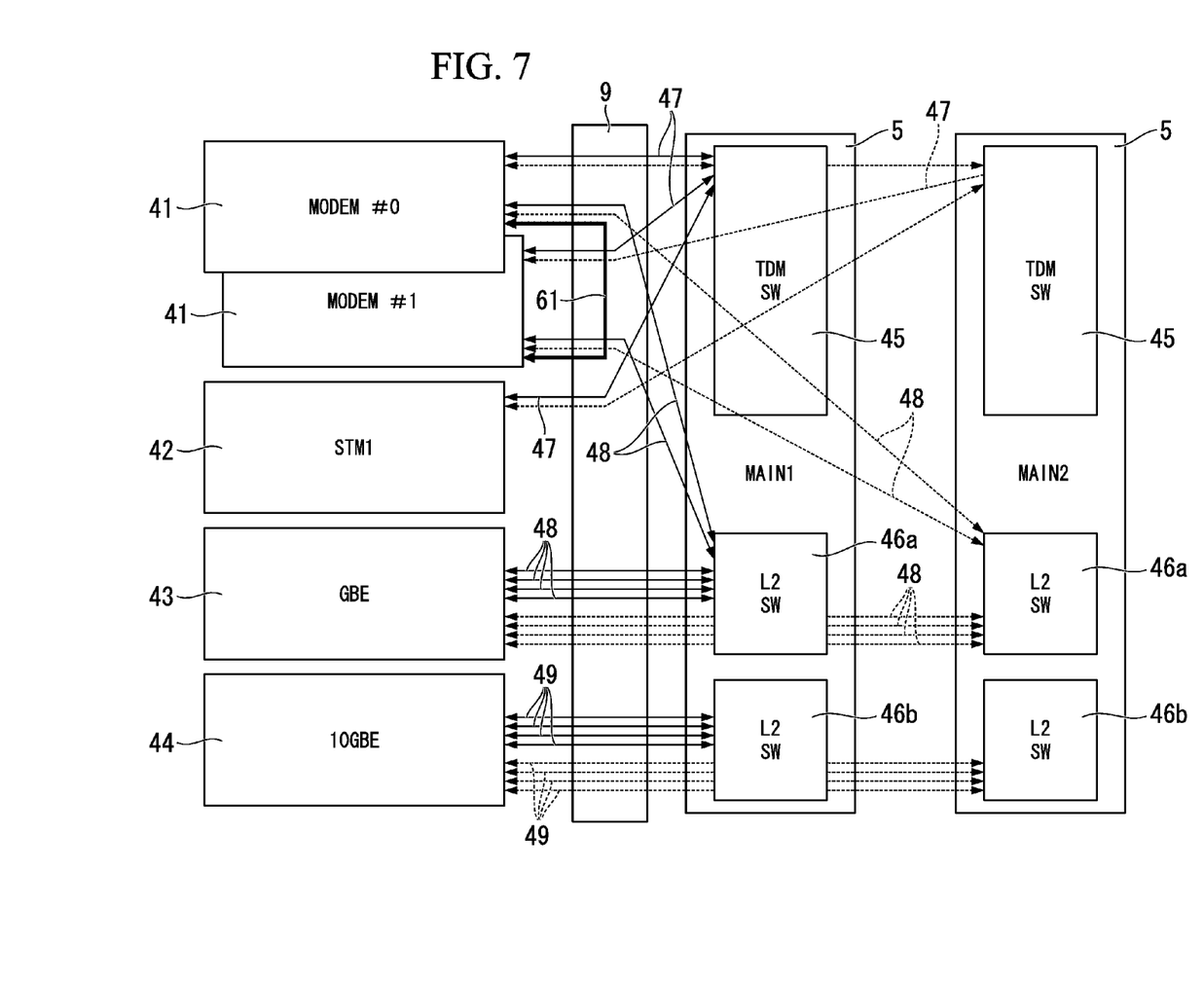
FIG. 7 is a view that shows the connection configuration of control boards and main signals of communication units of the transmission apparatus shown in FIG. 2.

The high-speed communication unit 4b has a 10 GbE interface 44 that supports the 10 GbE standard (refer to FIG. 7). A connector (not illustrated) that can communicate at least optical signals is provided in the high-speed communication unit 4b.

The external device connection board 8 is a board for connecting an external device such as a personal computer with and the control board 5. Although not illustrated, a connector for enabling communication is provided on the front panel of the external device connection board 8. The external device connection board 8 is constituted to be connectable to either of the two control boards 5.

Next, the connection configuration of the main signals of the control board 5 and the low-speed communication units 4a and the high-speed communication units 4b shall be described.

As shown in FIG. 7, the pair of modems 41, the STM-1 interface 42, the GbE interface 43, and the 10 GbE interface 44 are connected with the two control boards 5 via the motherboard 9. A TDM switch 45 that performs TDM (time division multiplex) data transfer processing, and two L2 switches 46 are mounted on each of the control boards 5.

Each modem 41 that is mounted in the low-speed communication unit 4a is connected to the TDM switch 45 of each control board 5 via the TDM bus 47 of the motherboard 9, and also connected to one L2 switch 46a of each control board 5 via the SMGII bus 48. Also, the modems 41 are mutually connected via a confounding line 61.

An STM-1 interface 42 that is mounted on the low-speed communication units 4a is connected with the TDM switch 45 via a TDM bus 47. The STM-1 interface 42 is one of an SDH (Synchronous Digital Hierarchy), and is an interface that has a transmission speed of 155.52 Mbps.

The GbE interface 43 that is mounted on the low-speed communication units 4a is connected with one L2 switch 46a via the four SMGII buses 48. The SMGII buses 48 are interfaces that, by each one, realize the communication speed of 1.25 Gbps. The communication standard that is adopted for the GbE interface 43 is not limited to this, and provided it can be applied to the communication standard of Gigabit Ethernet (registered trademark), any interface may be adopted.

The 10 GbE interface 44 that is mounted on the high-speed communication units 4b is connected with the other L2 switch 46b via the four XAUI buses 49. The XAUI buses 49 are interfaces that, by each one, realize a communication speed of 3.125 Gbps. The communication standard that is adopted for the 10 GbE interface 44 is not limited to this, and provided it can be applied to the communication standard of 10 Gigabit Ethernet (registered trademark), any interface may be adopted.

Next, the arrangement of each constituent element in the board insertion portion 22 shall be described.

Figure 8:
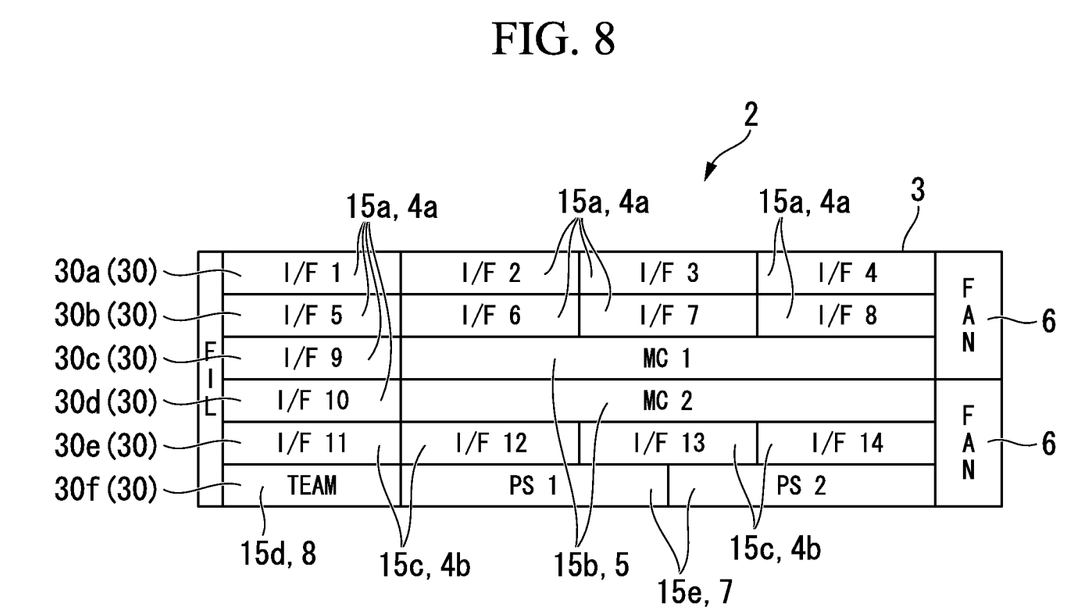
FIG. 8 is a view for explaining the arrangement of boards of the transmission apparatus shown in FIG. 2.

As shown in FIG. 8, the stage 30a and the stage 30b are divided into four low-speed communication slots 15a. The low-speed communication slots 15a are connected with the control boards 5 via a bus that corresponds to the low-speed communication on the motherboard 9. The low-speed communication units 4a are connected to the low-speed communication slots 15a.

The stage 30c and the stage 30d have on the left side the low-speed communication slot 15a that has a width of ¼ of the entire width of the stage 30. Also, the stage 30c and the stage 30d have on the right side a control board slot 15b that has a width of ¾ of the entire width of the stage 30. The low-speed communication unit 4a is connected to the low-speed communication slot 15a of each of the stage 30c and the stage 30d. The control board 5 is connected to the control board slot 15b of each of the stage 30c and the stage 30d.

The stage 30e is divided into four high-speed communication slots 15c. The high-speed communication slots 15c are connected with the control board 5 via a bus that corresponds to high-speed communication. The high-speed communication units 4b are connected with the high-speed communication slots 15c. It is possible to connect any low-speed communication unit to the high-speed communication slots 15c, but it is not possible to implement a GbE interface in a low-speed communication unit. The reason is because the 10 GbE wiring (XAUI: 3.125 Gbps) and the GbE wiring (SMGII: 1.25 Gbps) are shared on the motherboard 9.

The stage 30f has an external device connection slot 15d similar to the communication slots 15a and 15c, and two power supply slots 15e. The external device connection slot 15d has a width of ¼ of the total width of the stage 30. The two power supply slots 15e respectively have a width that divides into two the remaining width (the width 30 excluding the slot 15d of the stage 30f). An external device connection board 8 is connected to the external device connection slot 15d. The power supply unit 7 is connected to each of the two power supply slots 15e.

Of the fan units 6, one fan unit 6 is arranged so as to discharge heat of the one control board 5, and the other fan unit 6 is arranged so as to discharge the heat of the other control board 5.

Figure 9:
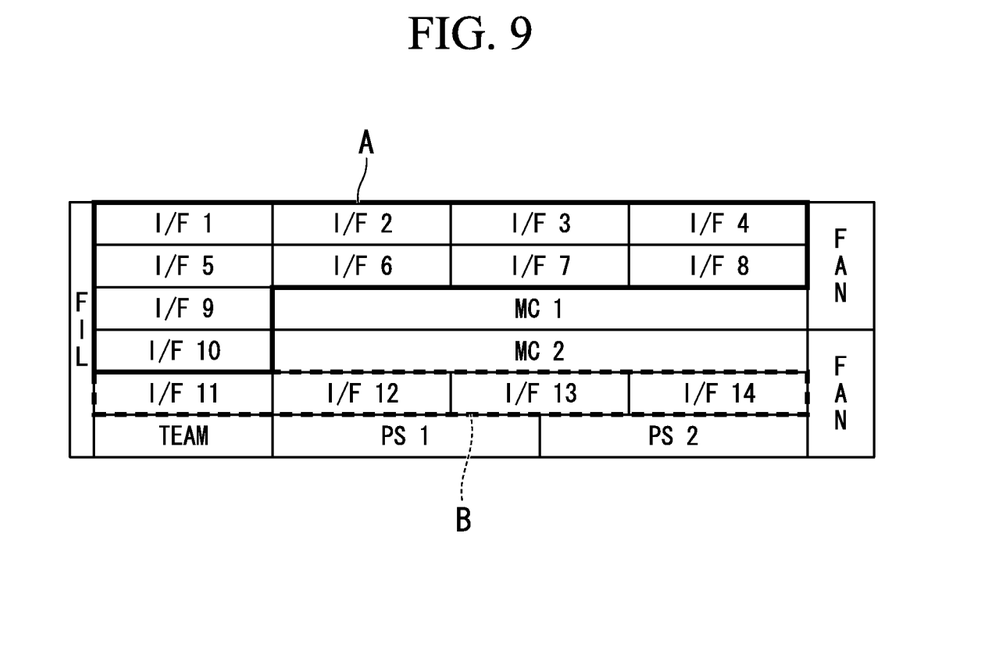
FIG. 9 is a view for explaining the arrangement of low-speed communication units and the high-speed communication units of the transmission apparatus shown in FIG. 2.

As shown by the area enclosed by the solid line A in FIG. 9, there are provided ten low-speed communication slots 15a. The low-speed communication slots 15a are grouped from stage 30a to stage 30d, that is, from the first stage to the fourth stage. I/F1 to I/F10 in FIG. 8 and FIG. 9 denote the low-speed communication units 4a that are mounted in the low-speed communication slots 15a. In the present exemplary embodiment, in order to ensure redundancy, the low-speed communication units 4a that are respectively mounted in I/F1 and I/F2 are set so as to form a pair. That is to say, two low-speed communication units 4a are made to have a redundant constitution, and thus, it is constituted so that, in the case of one low-speed communication unit 4a (FF1, for example) failing, the other low-speed communication unit 4a (I/F2, for example) covers it.

Similarly, the low-speed communication units 4a are mounted in I/F3 and I/F4; I/F5 and I/F6; I/F7 and I/F8; I/F9 and I/F10, so as to form a pair with each other, and thereby redundancy is ensured.

Also, the FF9 and FF10 are constituted so as to form a pair that straddles the stage 30c and the stage 30d, and so it is possible to ensure redundancy with less space.

Also, as shown by the area enclosed by the dotted line B of FIG. 9, there are provided four high-speed communication slots 15c in the stage 30d. I/F11 to FF14 in FIG. 8 and FIG. 9 are high-speed communication units 4b that are mounted in high-speed communication slots 15c. In order to ensure redundancy, the two high-speed communication units 4b that form a pair are mounted in the I/F11 and the I/F12, and the two high-speed communication units 4b that form a pair are mounted in I/F13 and I/F14.

Also, as shown by FIG. 8 and FIG. 9, the plurality of low-speed communication units 4a and the plurality of high-speed communication units 4b are arranged so as to sandwich the two control boards 5 from above and below. In particular, all of the high-speed communication units 4b are arranged in the stage 30e adjacent to the control board 5.

According to the aforementioned exemplary embodiment, it is possible to ensure redundancy of the apparatus, and realize a high reliability even in the case of a failure occurring in one control board 5, by mounting the control boards 5 in each of the stage 30c and stage 30d that are adjacent.

Also, in addition to the plurality of low-speed communication units 4a, it is possible to mount the plurality of high-speed communication units 4b with redundancy ensured for each of the low-speed and high-speed communication units 4a, 4b.

Also, the low-speed communication units 4a and the high-speed communication units 4b are arranged so as to sandwich the control boards 5 therebetween, and thereby the wiring is dispersed. With this constitution, it is possible to increase the efficiency of the wiring and inhibit an increase in density of the wiring. In particular, by arranging the high-speed communication units 4b (slots 15c) to be adjacent with the control boards 5, it is possible to shorten the wiring of the slots 15c and the control boards 5, and it is possible to inhibit degradation of data.

Also, since not only the communication units 4, but also the power supply units 7 and the fan units 6 are constituted to be capable of being inserted in and removed from the slots 15 and 16, they can be easily replaced. Moreover, since two of the fans 20 are provided in the one fan unit 6, even in the case of a fault arising in one fan 20, it is possible to ensure the redundancy of the apparatus.

While the invention has been particularly shown and described with reference to the exemplary embodiment thereof, the invention is not limited to the embodiment. It will be understood by those of ordinary skill in the art that various changes in form and details may be made therein without departing from the scope of the present invention as defined by the claims.

For example, the number of stages 30 is not limited to six stages. For example, provided the transmission apparatus 2 includes the low-speed communication units 4a and the high-speed communication units 4b, and it is possible to arrange the low-speed communication units 4a and the high-speed communication units 4b so as to sandwich the control boards 5 and disperse the wiring, the stages 30 may be constituted with three stages.

Also, although the external device connection board 8 is provided separate from the two control boards 5 in the present exemplary embodiment, it is not limited to this constitution. For example, a constitution is possible that provides a connector for an external device connection on each of the control boards 5.

What is claimed is:

1. A transmission apparatus comprising:
   a case that includes at least first, second, and third stages, each of the stages having at least one slot, each slot allowing free insertion and removal of a board;
   at least a first control board;
   at least one first communication unit that is connected with the first control board and performs radio communication; and
   at least one second communication unit that is connected with the first control board and performs communication that is faster than the radio communication, wherein:
   the first control board is mounted in the slot of the first stage;

the first communication unit is mounted in the slot of the second stage, and the second stage is provided on one side of the first stage;

the second communication unit is mounted in the slot of the third stage, and the third stage is provided on a side opposite to the first communication unit with respect to the first stage; and the second communication unit is arranged adjacent to the first control board.

2. The transmission apparatus according to claim 1, further comprising:

a pair of first communication units including the first communication unit; and a pair of second communication units including the second communication unit, wherein the pair of first communication units are mounted in slots of the same second stage and the pair of second communication units are mounted in slots of the same third stage so as to have a redundant configuration.

3. The transmission apparatus according to claim 1, further comprising:

a second control board, wherein:

the casing further includes a fourth stage having a slot, the fourth stage being provided between the first and the third stages;

the second control board is mounted in the slot of the fourth stage; and the first communication unit and the second communication unit are each connected to the first and second control boards.

4. The transmission apparatus according to claim 3, further comprising:

first, second, and third pairs of first communication units including the first communication unit; and first and second pairs of second communication units including the second communication unit, wherein:

the second and third stages each have four slots, and the first and fourth stages each have two slots;

the first and second pairs of first communication units are mounted in the four slots of the second stage;

the first and second pairs of second communication units are mounted in the four slots of the third stage; and the third pair of first communication units are mounted in a slot of the first stage and a slot of the fourth stage.

5. The transmission apparatus according to claim 3, further comprising:

first and second pairs of first communication units including the first communication unit; and first, second, and third pairs of second communication units including the second communication unit, wherein:

the second and third stages each have four slots, and the first and fourth stages each have two slots;

the first and second pairs of first communication units are mounted in the four slots of the second stage;

the first and second pairs of second communication units are mounted in the four slots of the third stage; and the third pair of second communication units are mounted in a slot of the first stage and a slot of the fourth stage.

6. The transmission apparatus according to claim 1, wherein:

the second stage is arranged above the first control board;

the third stage is arranged below the first control board; and a communication unit is mounted in the same first stage as the first control board.

7. The transmission apparatus according to claim 1, wherein the radio communication is microwave communication.

8. The transmission apparatus according to claim 1, further comprising:

at least one power supply; and an external device connection board, wherein the case further includes a fifth stage, and the at least one power supply board, and the external device connection board are mounted in the fifth stage.

9. The transmission apparatus according to claim 1, further comprising:

a fun unit that is detachably provided on a first side of the first to third stages, the fun unit having a plurality of fans that forcibly cool inside of the case, the fans being arranged in a depth direction.

10. The transmission apparatus according to claim 1, further comprising:

a filter that is detachably provided on a second side of the first to third stages, and removes dust.

11. A communication apparatus that performs signal control of radio communication and optical communication, the apparatus comprising:

a control board;

a first communication unit that is arranged on one side of the control board and performs the radio communication; and a second communication unit that is arranged adjacent to the control board and arranged on a side opposite to the first communication unit with respect to the control board, and performs the optical communication that is faster than the radio communication, wherein the control board is arranged so as to be sandwiched between the first communication unit and the second communication unit, and the control board transmits a transmission signal from each of the first and second communication units.

* * * * *

UNITED STATES PATENT AND TRADEMARK OFFICE
CERTIFICATE OF CORRECTION

PATENT NO. : 8,644,775 B2  Page 1 of 1
APPLICATION NO. : 13/434086
DATED : February 4, 2014
INVENTOR(S) : Kazuki Yoshida and Sadaaki Miyamoto It is certified that error appears in the above-identified patent and that said Letters Patent is hereby corrected as shown below:

In the Specification

Column 7, Line 47: Delete "(FF1," and insert -- (I/F1, --

Column 7, Line 54: Delete "FF9" and insert -- I/F9 --

Column 7, Line 54: Delete "FF10" and insert -- I/F10 --

Column 7, Line 59: Delete "FF14" and insert -- I/F14 --

Signed and Sealed this
Twenty-fifth Day of November, 2014

Michelle K. Lee
*Deputy Director of the United States Patent and Trademark Office*